(12) United States Patent
Heger et al.

(10) Patent No.: US 7,640,259 B2
(45) Date of Patent: Dec. 29, 2009

(54) SYSTEMS AND METHODS FOR MODELING TREE STRUCTURES

(75) Inventors: Achim Heger, Leimen (DE); Karsten Koetter, Heidelberg (DE)

(73) Assignee: SAP AG, Walldorf (DE)

( * ) Notice: Subject to any disclaimer, the term of this patent is extended or adjusted under 35 U.S.C. 154(b) by 254 days.

(21) Appl. No.: 11/193,362

(22) Filed: Aug. 1, 2005

(65) Prior Publication Data

US 2007/0027884 A1 Feb. 1, 2007

(51) Int. Cl.
  *G06F 7/00* (2006.01)
  *G06F 17/00* (2006.01)
  *G06F 15/16* (2006.01)

(52) U.S. Cl. ..................... 707/101; 707/205; 707/206; 711/117

(58) Field of Classification Search ............... 707/1–10, 707/100–104.1, 200–206; 395/611, 612; 370/252–503; 709/232–240; 711/117
See application file for complete search history.

(56) References Cited

U.S. PATENT DOCUMENTS

| | | | | |
|---|---|---|---|---|
| 5,644,763 A * | 7/1997 | Roy | ............................ | 707/101 |
| 5,740,425 A * | 4/1998 | Povilus | ........................ | 707/100 |
| 5,758,356 A * | 5/1998 | Hara et al. | ................... | 707/202 |
| 6,480,857 B1 * | 11/2002 | Chandler | ..................... | 707/100 |
| 6,484,172 B1 * | 11/2002 | Lee et al. | ........................ | 707/8 |
| 6,862,599 B2 * | 3/2005 | King | ........................... | 707/100 |
| 2004/0133590 A1 * | 7/2004 | Henderson et al. | ........... | 707/102 |
| 2006/0026219 A1 * | 2/2006 | Orenstein et al. | ............ | 707/204 |
| 2006/0153099 A1 * | 7/2006 | Feldman et al. | .............. | 370/254 |
| 2006/0173882 A1 * | 8/2006 | Furukawa et al. | ............ | 707/101 |
| 2006/0173927 A1 * | 8/2006 | Beyer et al. | ............... | 707/201 |
| 2006/0253465 A1 * | 11/2006 | Willis et al. | ................. | 707/100 |

* cited by examiner

*Primary Examiner*—Cam Y Truong
*Assistant Examiner*—Cecile Vo
(74) *Attorney, Agent, or Firm*—Finnegan, Henderson, Farabow, Garrett & Dunner, L.L.P.

(57) ABSTRACT

Systems and methods are provided for inserting a new node into a tree structure for use within a database system, wherein the tree structure comprises one or more parent nodes having space there under, and one or more child nodes; wherein each node comprises an identification, a left value, a right value, a width, and a tree node interval; each child node comprises of a pointer to the associated parent node of the child node; and the new node is a child node having an identification corresponding to the identification of a parent node. The method may comprise determining the identification of the parent node of the new node, determining the width of the new node, determining whether a gap exists in the tree structure for a parent node having an identification equal to the determined parent node identification, and if a gap exists, inserting the new node into the gap if the width of the gap is equal to or greater than the width of the new node.

5 Claims, 12 Drawing Sheets

| /lime/tree | | | | |
|---|---|---|---|---|
| lft | rgt | gap | guid | parent |
| 100 | 199 | 0 | L1 | Root |
| 200 | 299 | 0 | L2 | Root |
| 300 | 399 | 0 | L3 | Root |
| ~~111~~310 | ~~120~~319 | 0 | H2 | ~~L1~~L3 |
| ~~112~~311 | ~~112~~311 | 0 | H4 | H2 |
| ~~113~~312 | ~~113~~312 | 0 | H5 | H2 |
| ~~310~~111 | ~~319~~120 | 10 | Gap | ~~L3~~L1 |

Fig. 6C

SYSTEMS AND METHODS FOR MODELING TREE STRUCTURES

TECHNICAL FIELD

The present invention generally relates to implementing tree structures with relational databases. More particularly, the invention relates to computerized systems and methods for implementing tree structures with relational databases including adding, deleting and moving nodes within the tree structures.

BACKGROUND

Various methods of managing collections of data (e.g., databases) have been developed since data was first stored in electronic form. From initial systems and applications that simply collected data in one or more flat database files to present sophisticated database management systems (DBMS), different solutions have been developed to meet different requirements. Early solutions may have had the advantage of simplicity but became obsolete for a variety of factors, such as the need to store large, even vast, quantities of data, a desire for more sophisticated search and/or retrieval techniques (e.g., based on relationships between data), and the need to store different types of data (e.g., audio, visual), etc.

A database management system, or DBMS, gives the user access to his data and helps him transform the data into information. A DBMS allows users to create, update, and extract information from his databases. Compared to a manual filing system, the biggest advantages to a computerized database system are speed, accuracy, and accessibility.

A hierarchical database is a kind of database management system that links records together in a tree data structure such that each record type has only one owner, e.g. an order is owned by only one customer. A relational database can be seen as the data handling part of another application. The application instructs the database to perform searches, as well as add, delete and modify data via the Structured Query Language or SQL.

Various techniques have been used to implement a hierarchical tree structure with relational databases. These techniques can be used for implementing as well as updating a tree structure. For example, the adjacent list technique can be used, where each tree node in a tree structure stores a pointer to its parent. This technique however, is not efficient because a user cannot retrieve children of a node over multiple levels with one standard SQL statement. To get the grandchild, you first have to select the children, and with a second SQL select, the children of the children. Another technique, the string set, where the hierarchy is mapped to a string field can be used. However, this technique is not useful because the length of the string of each node implies a fixed tree depth and modification in the tree structure requires complicated database operations.

Accordingly, there is a need for improved systems and methods for efficiently implementing tree structures with relational databases.

SUMMARY

One exemplary embodiment of the invention relates to a tree structure for use within a database system. The tree structure may comprise of one or more parent nodes; and one or more child nodes each associated with a parent node; wherein each parent node and each child node comprises an identification, a left value, a right value, and a tree node interval; and each child node comprises a pointer to the associated parent node of the child node.

Another exemplary embodiment relates to a method for inserting a new node into a tree structure for use within a database system, wherein the tree structure comprises one or more parent nodes having space there under, and one or more child nodes; wherein each node comprises an identification, a left value, a right value, a width, and a tree node interval; each child node comprises of a pointer to the associated parent node of the child node; and the new node is a child node having an identification corresponding to the identification of a parent node. The method may comprise determining the identification of the parent node of the new node; determining the width of the new node; determining whether a gap exists in the tree structure for a parent node having an identification equal to the determined parent node identification; and if a gap exists, inserting the new node into the gap if the width of the gap is equal to or greater than the width of the new node.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
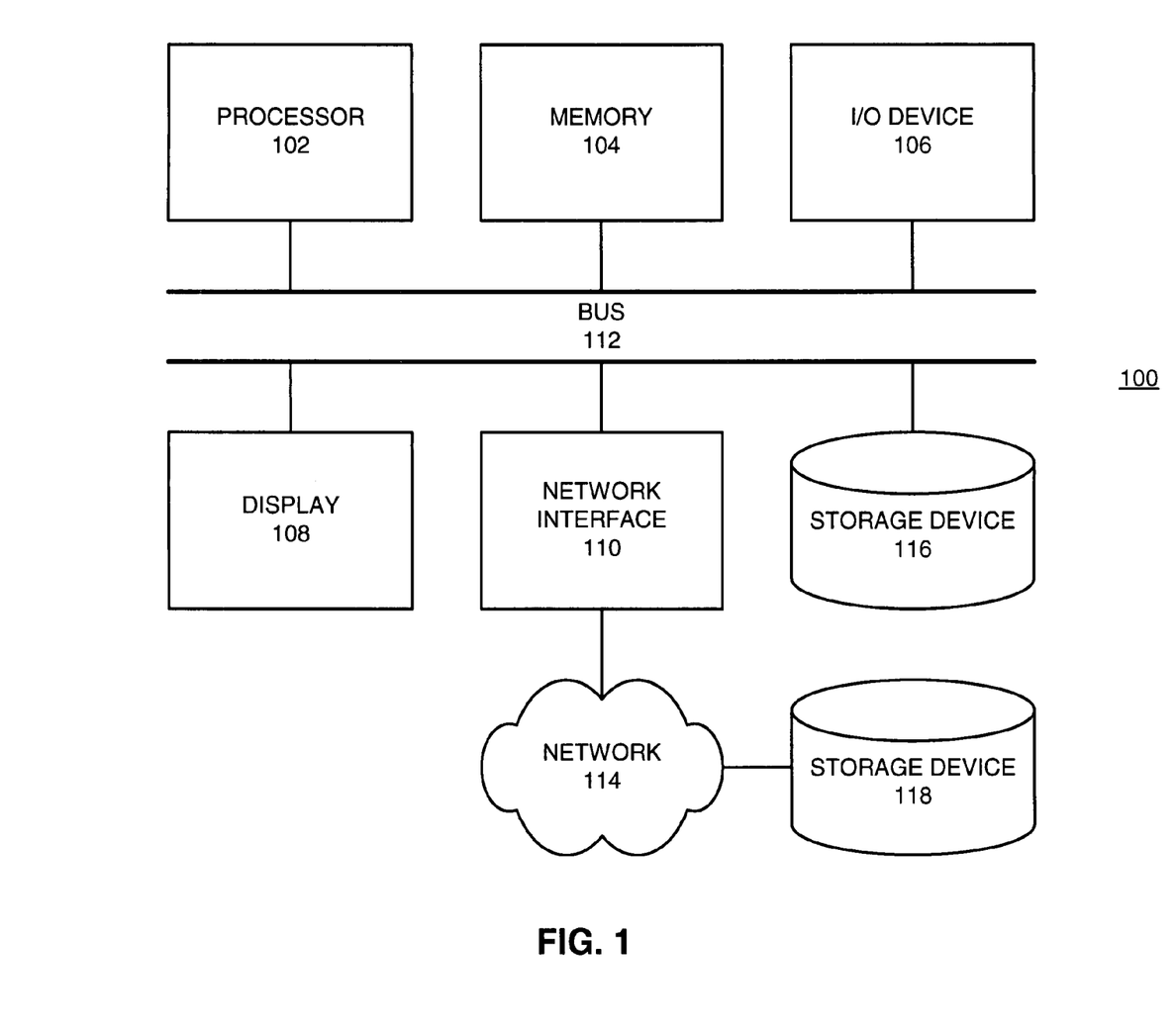
FIG. 1 illustrates an exemplary computer system, consistent with the present invention.

FIG. 1 is a block diagram on an exemplary system, that may use a database and database operations of the embodiments of the present invention. System 100 may include a processor 102, a memory 104, an input/output (I/O) device 106, a display 108, a network interface 110, a bus 112, a network 114, and one or more persistent storage devices 116 and 118. Processor 102, memory 104, I/O device 106, display 108, network interface 110, and storage device 116 may be configured to communicate over bus 112. Storage device 116 and network interface 110 may be configured to communicate over network 114.

In the example of FIG. 1, processor 102 may include a mainframe, a laptop, a personal computer, a workstation, a computer chip, a digital signal processor board, an analog computer, a plurality of processors, or any other information processing device or combination of devices. Further, processor 102 may be implemented by a general purpose computer or data processor selectively activated or reconfigured by a stored computer program, or may be a specially constructed computing platform for carrying out the features and operations disclosed herein. Memory 104 may include random access memory (RAM), read-only memory (ROM), flash memory, or any other information storage device. I/O device 106 may include a keyboard, a mouse, a trackball, a light pen, an electronic tablet, or any other mechanism to communicate input or output data with SNP system 100. Display 108 may include a cathode-ray-tube monitor, a plasma screen, a liquid-crystal-display screen, or any other device to display or otherwise convey information from SNP system 100.

Network interface 110 may include an Ethernet card, an FDDI card, a modem, or any other mechanism for interfacing to a network. Bus 112 may include a data cable, a circuit board connection, a fiber optic line, a network, a serial connection, a parallel connection, or any other mechanism for conveying information between processor 102, memory 104, I/O device 106, display 108, network interface 110, and/or storage device 116. Network 114 may include a local area network (LAN), a wide area network (WAN), an Intranet, an Extranet, the Internet, a telephone network, a wireless network, a wired network, and/or any other means for communicating between locations.

Storage devices 116 and 118 may include a hard drive, a tape drive, a RAID disk array, a database system, an optical disk drive, and/or any other device or system that persistently stores information. A database in storage devices 116 and 118 may store various types of data, including enterprise-wide data, such as master data and transactional data in one or more tables. Transactional data may include, for example, data pertaining to inventory, orders (including stock or product transfer orders), sales, etc. The above-noted items are merely examples and, as will be appreciated by those skilled in the art, other types of data may be stored in the database according to the needs of the user and/or the system 100.

Figure 2A:
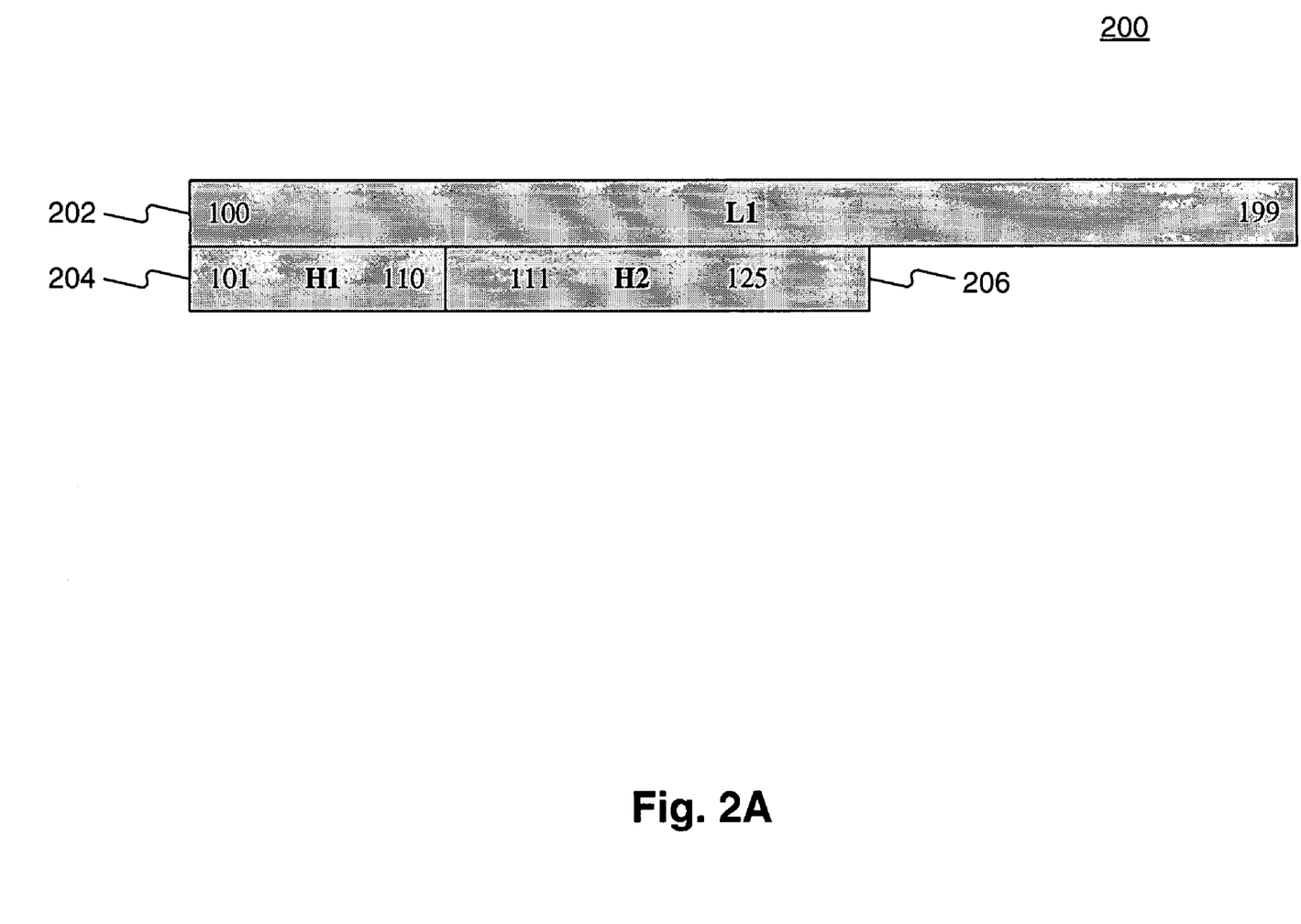
FIG. 2A is a block diagram of a hierarchical tree structure, consistent with the present invention.

FIG. 2A is a block diagram of a hierarchical tree structure, consistent with an embodiment of the present invention. The hierarchical tree structure may be used within a DBMS such as one stored in storage devices 116 and 118. The hierarchical tree structure may be stored within one or more tables of a DBMS, as will be discussed below. A database table may contain one entry for each node of the tree structure. The hierarchical tree structure 200 may be defined as follows. The tree structure may comprise of one or more parent nodes (ex: "L1" 202) and one or more child nodes (e.g., "H1" 204" and "H2" 206). Each node comprises of an ID as well as a left value and a right value. For example, the node "L1" 202 has an identification (ID) of "L1," a left value of "100," and a right value of "199." Each node of the tree structure may maintain a pointer to its direct parent. Each child node comprises a pointer to the associated parent node of the child node. For example, "H1" 204 maintains a pointer to its parent "L1" 202, and "H2" 206 also maintains a pointer to its parent "L1" 202.

A tree node interval is the number range that is reserved for a tree node within the tree structure. Each node in the tree structure has a tree node interval. The tree node interval is the left value and the right value assigned to each node. The tree node interval is determined once the width of the node is determined. The width of a node is the difference between the left and right values of each respective node plus "1." The width of each parent node is the difference between the left value an the right value of the respective parent node. The width of each child node is the difference between the left value and the fight value of the respective child node. The width of a node may be a default node or may be determined by a user. For example, the left value of "L1" 202 is "100" and the right value of "L1" 202 is "199." The width of "L1" 202 is "199-100+1" which is "100." The left value of each node is smaller than or equal to the right value of the respective node. The left value of each child node is greater than the left value of the associated parent node of the child node. For example, the left value of "H1" 204 is "101" and this value is greater than the left value of the parent of "H1" 204 which is "L1" having a left value is "100." The first child node in the tree structure starts with the left value of the parent node plus 1. Therefore, the left most child node "H1" 204 has a left value of "101" which is "1" plus the left most value of the parent "L1" 202 which is "100." The left and right values of each of the nodes on the same level also do not overlap. For example, with regard to the tree structure 200 in FIG. 1A, the left and right values of "H1" 204 and "H2" 206 do not overlap. "H1" 204 covers left value "101" to right value "110," and "H2" covers left value "111" to right value "125."

Figure 2B:
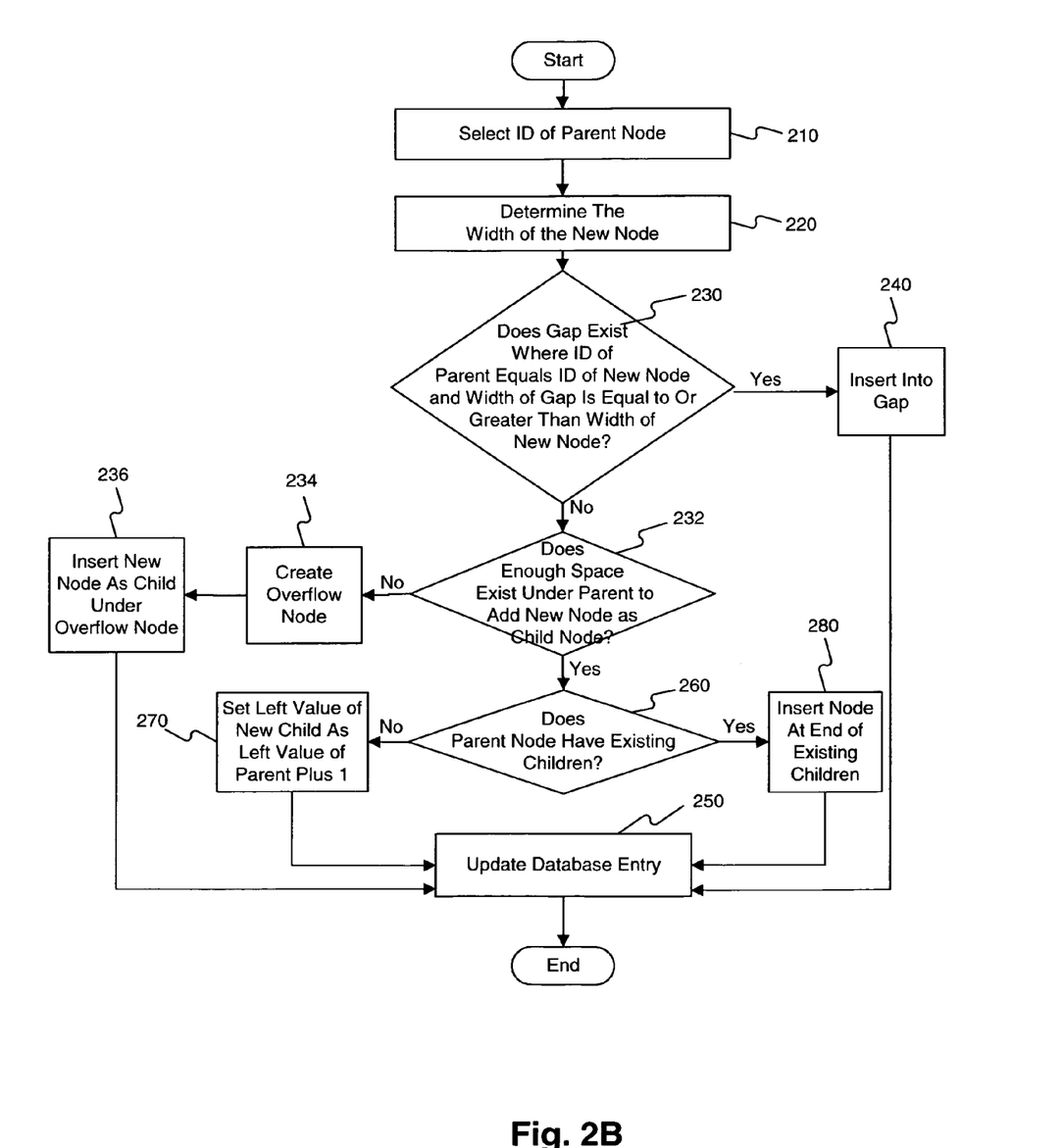
FIG. 2B is an exemplary method for inserting a new node into a tree structure, consistent with the present invention.

FIG. 2B is an exemplary method for inserting a new node into a tree structure, consistent with an embodiment of the present invention. To insert a node into the tree structure, system 100 may first select the ID of the parent node (stage 210) and then determine the width of the new node (stage 220). The ID of the parent node is known to System 100. For example, if system 100 is a warehouse management system, then the tree may reflect the hierarchy of a warehouse, with racks, and storage places within the racks. If a user wanted to add an additional rack, he would have to specify the ID of the warehouse, which would be the parent ID for the new rack.

A new node may have a default width given by the level in the hierarchy, that means higher nodes have larger default widths. The width of a node may be customized by the user of system 100. Furthermore the default width can be changed by the user. To insert a new node into a tree structure, system 100 may first try to re-use a previous gap. A gap is formed anytime a tree node that is no longer used is deleted from the tree structure. When a tree node is deleted, the space is marked as "gap." A gap may exist where one child node has a right value that is at least 2 values less than the left value of the next child node under the parent node.

Re-using a gap may be done by setting a field in the database table for the deleted node to be equal to the width of the gap. The width of the gap is determined by subtracting the left value of the deleted tree node from the right value of the deleted tree node and adding "1." A gap may be found where a node exists that has a right value that is at least 2 values less than the left value of the next node. Therefore, there exists a gap between the two nodes.

Once the width of the new tree node is determined, system 100 may determine whether a gap may be re-used by selecting a gap in the tree structure with a parent ID equal to the parent ID of the new node to be added and where the width of the gap is equal to or greater than the width of the new node (stage 230). If system 100 determines a gap does exist that meets these criteria, then system 100 may insert the new node into this tree entry that is a gap (stage 240), and then update the database entry representing the gap (stage 250), for example, within the database table in storage device 116. The database table may store information associated wit the tree structure in one or more tables. System 100 may also update the tree node interval of the new node. The tree node interval corresponds to the left and right values of the node. The tree node interval is updated based on where in the tree structure the new node gets inserted.

If system 100 does not find a gap where the ID of the parent equals the ID of the new node and the width of the gap is equal to or greater than the width of the new node, then system 100 may then determine whether enough space exists under the parent node of the new node to insert the new node as a child node (stage 232). This determination may be made by determining how large the width under the parent node is and whether the new node has a width that is the same size or smaller than this width. If system 100 determines that the space is not large enough for the new child under the current parent node, then system 100 may create an overflow node for the parent node of where the new should be inserted (stage 234), and then insert the new node as a child underneath the new overflow node (stage 236). System 100 may then insert the new overflow node as well as the new child node into the database table (stage 250), for example, within the database table in storage device 116. System 100 may also update the tree node interval of the new node. The tree node interval corresponds to the left and right values of the node.

If in stage 232 system 100 determines enough space exists under the parent of the new node, then system 100 may determine whether the parent node has any existing children (stage 260). If the parent node has existing children, system 100 may then insert the new node at the end of the existing children by setting the left value of the new child node as the right most value of the previous child plus "1" (stage 280). System 100 may then insert the new node into a database table (stage 250). If a last child does not exist, i.e., the parent node has no existing children, system 100 may then add the new child node by setting the left value of the child node as the left value of the parent node plus "1" and setting the pointer of the child node to point to the new parent node (stage 270). System 100 may then insert the new node into a database table (stage 250).

Figure 2C:
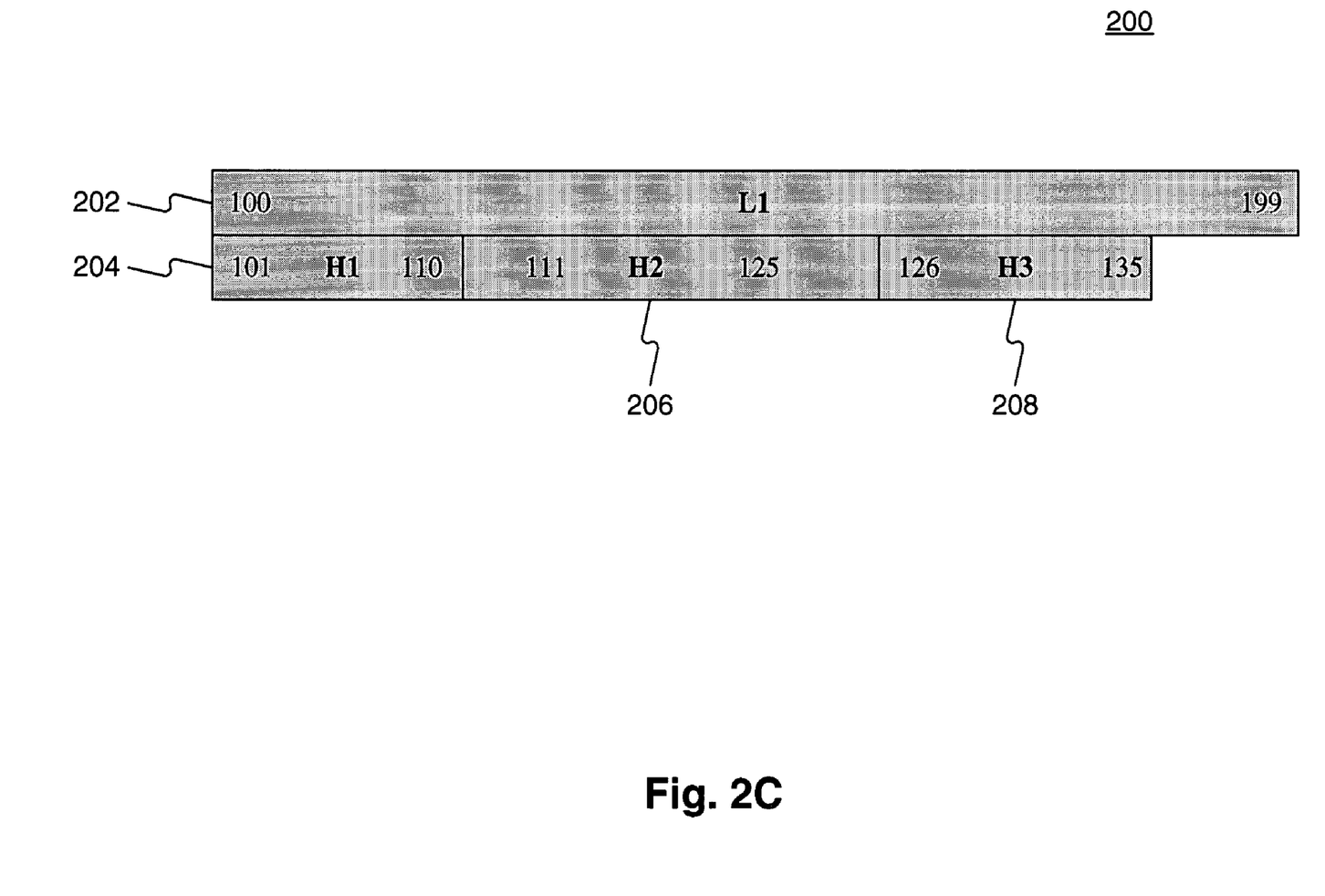
FIG. 2C is a block diagram of a new node being inserted to the end of existing child nodes of the tree structure, consistent with the present invention.

FIG. 2C is another block diagram of a hierarchical tree structure, where a new node is inserted to the end of the existing children of the tree structure, consistent with an embodiment of the present invention. The exemplary method in FIG. 2B will be described with regard to the exemplary tree structure in FIG. 2C. To insert the new node "H3" 208, system 100 may first determine the ID of the parent node of "H3" as being "L1" 202 (stage 210). System 100 may then determine the width of the new node (stage 220). "H3" has a default width of "10." System 100 may then determine there is no gap in the tree (stage 230) and that enough space does exist under the current parent "L1" 202 to add a new child node (stage 232). The amount of space available under "L1" 202 is the right value of the last child, "125" subtracted from the right value of the parent "199", plus "1," therefore the amount of space is "75" and width of the new node as determined in stage 220 is "10." System 100 may then determine that a last child does exist for the parent node, the last child being "H2" 206. Therefore, system 100 may then insert the node at the end of the exiting children (stage 280), and then may insert the new node into a table in the database (stage 250). The tree node interval of the inserted node is determined once it is added to the tree structure. The tree node interval is determined based on the width of the new node and the left and right values of the nodes surrounding the new added node. The tree node interval of "H3" is set at a left value of "126" and a right value of "135."

Figure 3A:
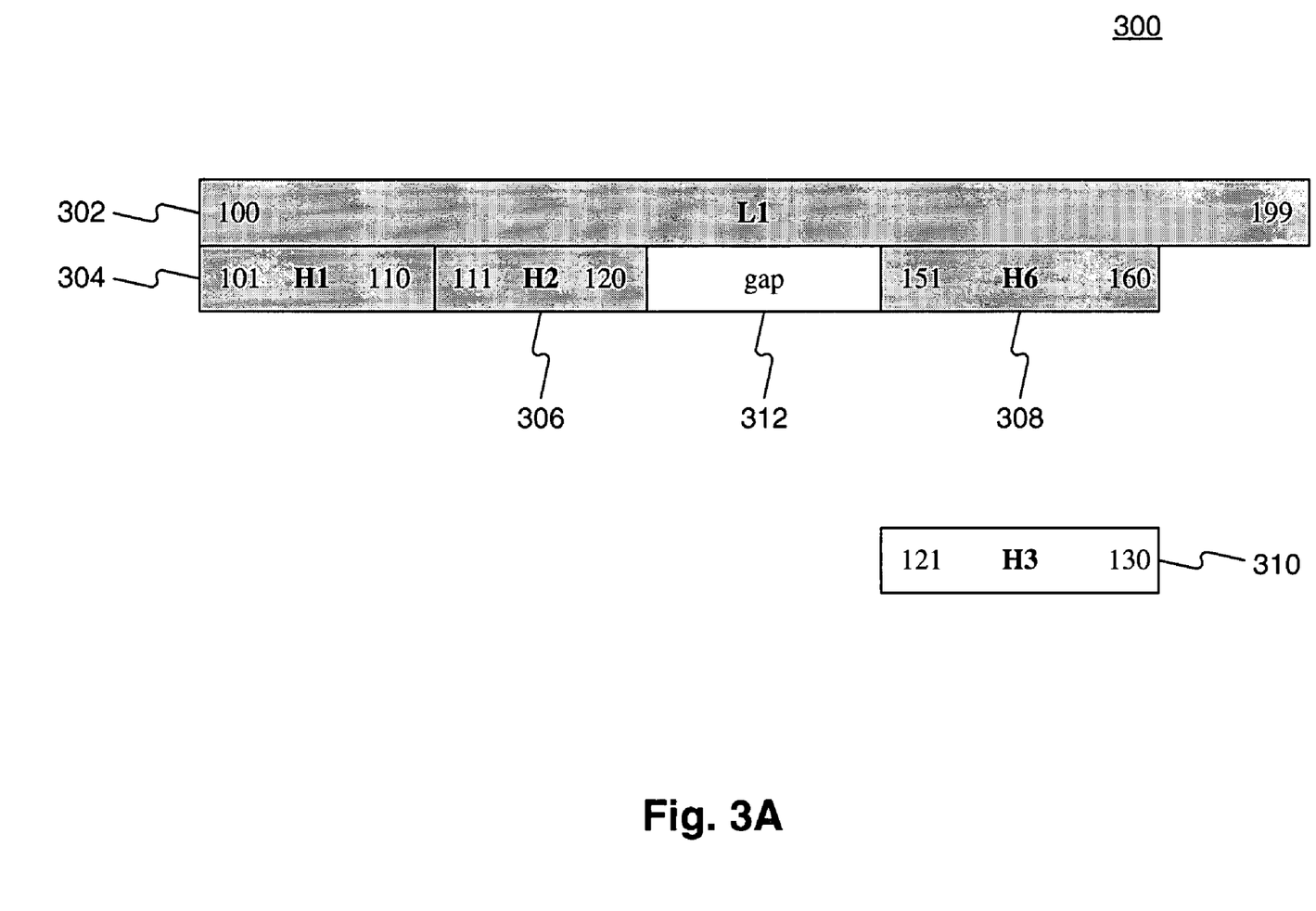
FIG. 3A is an exemplary block diagram of a new node being inserted to a gap in a hierarchical tree structure, consistent with the present invention.
Figure 3B:
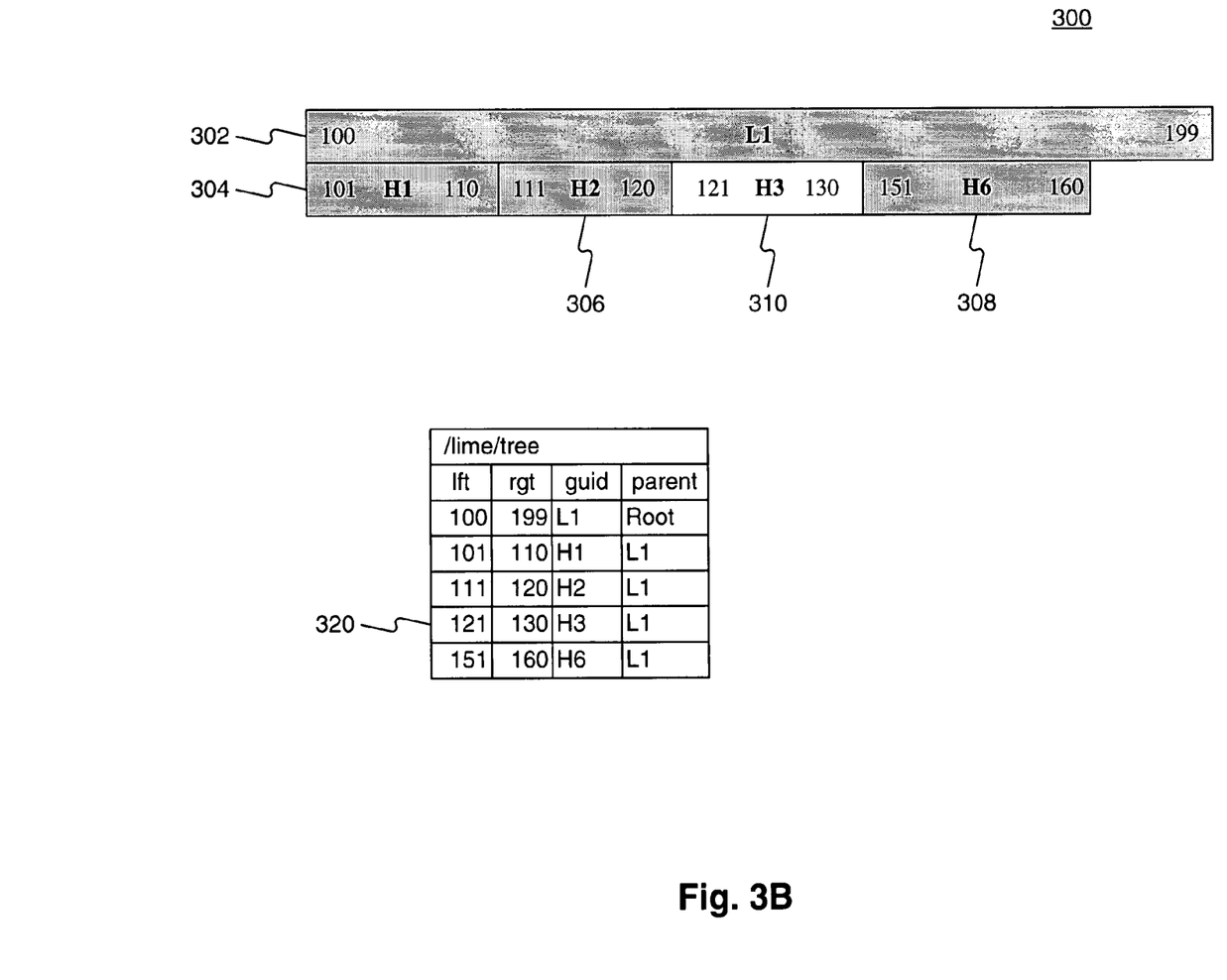
FIG. 3B is another exemplary block diagram of a new node being inserted to a gap in a hierarchical tree structure, consistent with the present invention.

FIG. 3A is an exemplary block diagram of a new node being inserted into a gap in a hierarchical tree structure, consistent with an embodiment of the present invention. If, for example, a new Node "H3" 310 is going to be added to tree structure 300, then system 100 may first determine that the ID of the parent node is "L1" 302 (stage 210). System 100 may then determine the width of the new node (stage 220). System 100 may then determine a gap does exist where the ID of the gap's parent equals the ID of the parent node of the new node, because the parent ID of the "gap" 312 is "L1" 302 and the parent ID of the new node "H3" is also "L1" 302 (stage 230). System 100 may also determine that the width of the "gap" 312 is "151-120+1=30" and the width of the new node as determined in stage 220 is "10," and therefore the gap is at least as large as the width of the new node (stage 230). System 100 may then insert the new node into the gap as shown in FIG. 3B (stage 240). System 100 may then also update the database table holding the information about the tree structure to reflect the new row 320, as shown in FIG. 3B (stage 250). System 100 may also update the tree node interval of the new added node. As shown in row 320, the table is updated so the left value of the new node is set as "121" which is the right most value of the last child before the gap plus "1" and the right most value of the new node is set as "130" which is the left most value of the new node "121" plus the width of "10" minus "1." Therefore the right most value is set as "130."

Figure 4A:
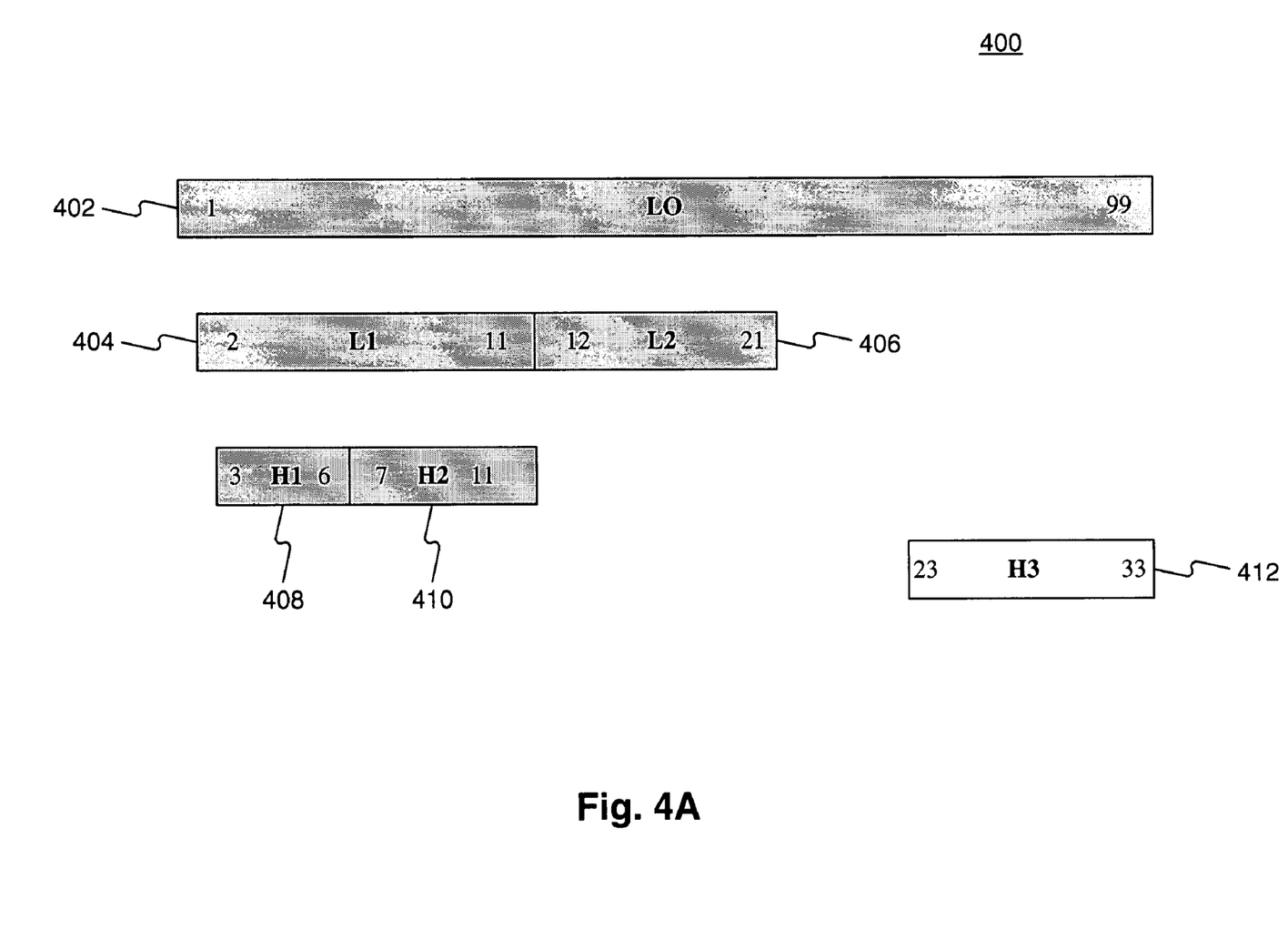
FIG. 4A is an exemplary block diagram of a new node being inserted to an overflow node in a hierarchical tree structure, consistent with the present invention.

FIG. 4A is an exemplary block diagram of a new node being inserted into an overflow node in a hierarchical tree structure, consistent with an embodiment of the present invention. In FIG. 4A, system 100 may try to add new node "H3" 412 to the tree structure 400. System 100 may first determine the ID of the parent node of the new node is "L1" 404 (stage 210). System 100 may then determine the width of the new node (stage 220). The default width of "H3" in this example is "10." System 100 may then determine that no gap exists where the ID of the parent node of the gap equals the ID of the parent node of the new node and the width of the gap is equal to or greater than the width of the new node (stage 230). There exists no gaps under "L1" 404. System 100 may then determine that there also does not exist enough space under the parent "L1" to add the new node as a new child node (stage 232). The parent node L1 has two children "H1" 408 and "H2" 410, and the right most value of "H2" is "11" which is also the right most value of the parent "L1," therefore there is no more space to add any new child nodes.

Figure 4B:
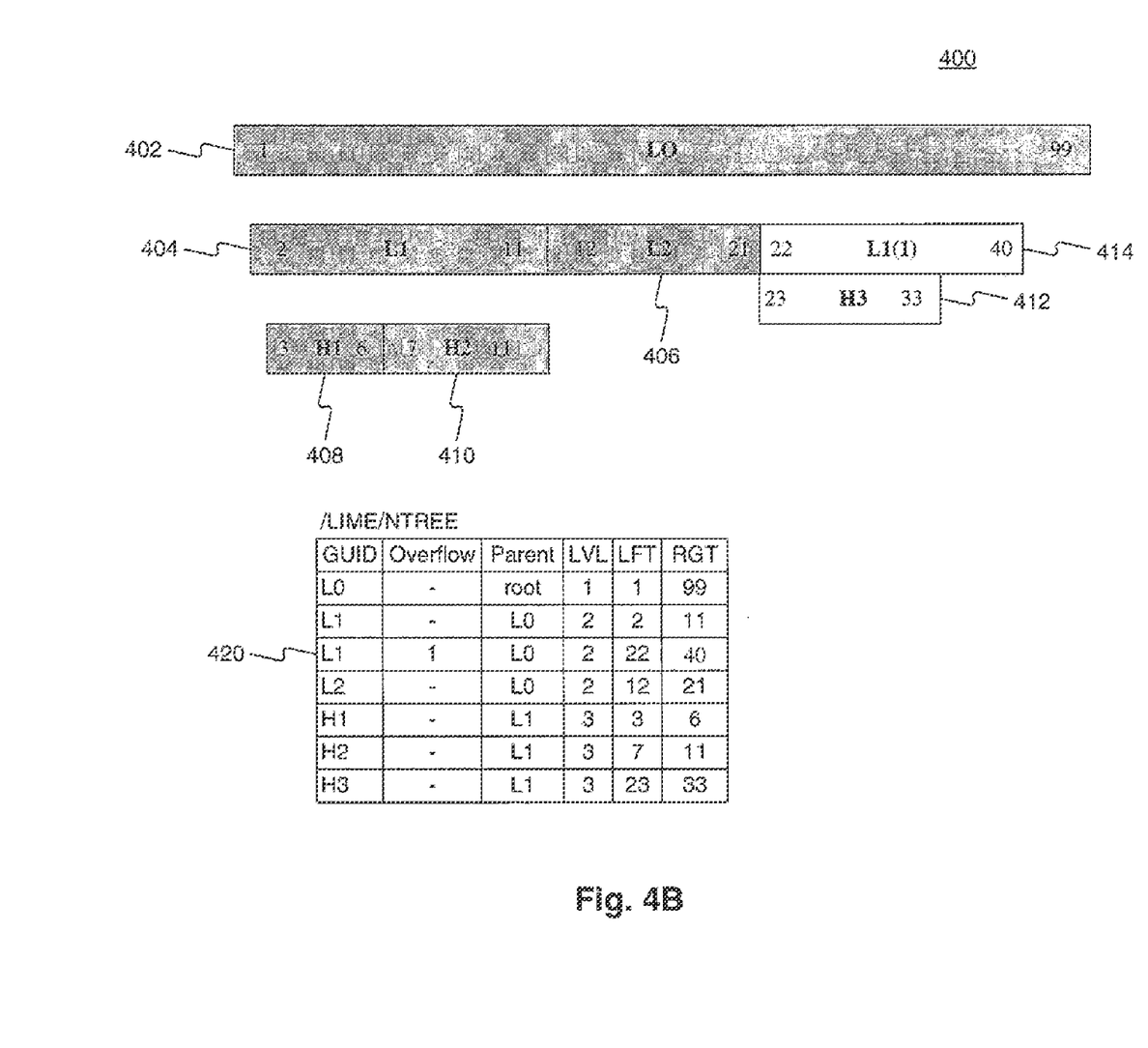
FIG. 4B is another exemplary block diagram of a new node being inserted to an overflow node in a hierarchical tree structure, consistent with the present invention.

System 100 may then create an overflow node for "L1" 404 naming it "L1(1)" 414, as shown in FIG. 4B. The overflow node has the same parent as the regular node, therefore the parent of "L1(1)" 414 is also "L0" 402. The overflow node may have an identification related to the identification of the associated parent node. Once the overflow node is created, the new child "H3" 412 is inserted underneath the overflow node "L1(1)" 414. Since the width of the new node "H3" is "11," the overflow node is created so that it can hold a child with a width of "11." The left most value of the overflow node "L1(1)" 414 is set as "1" plus the right most value of the last child under "L0" 402. The last child is "L2" 406 and the right most value of the right child is "21," so the left most value of the new overflow node "L1(1) is set as "22" and the right most value is "22+18=40". System 100 may then update the database table for the tree structure to reflect the new overflow node "L1(1)" 414 (stage 250). System 100 may also update the tree node interval of the new overflow node. As shown in row 420 of the table, the new overflow node is added with the parent "L0" with a left value of "22" and a right value of "40." The child "H3" 412 therefore is inserted as a new node under the overflow node L1(1) 414. The new node "H3" 412 has a left value of "23" that is larger than the left value of the new overflow node, the left value being "22."

Figure 5:
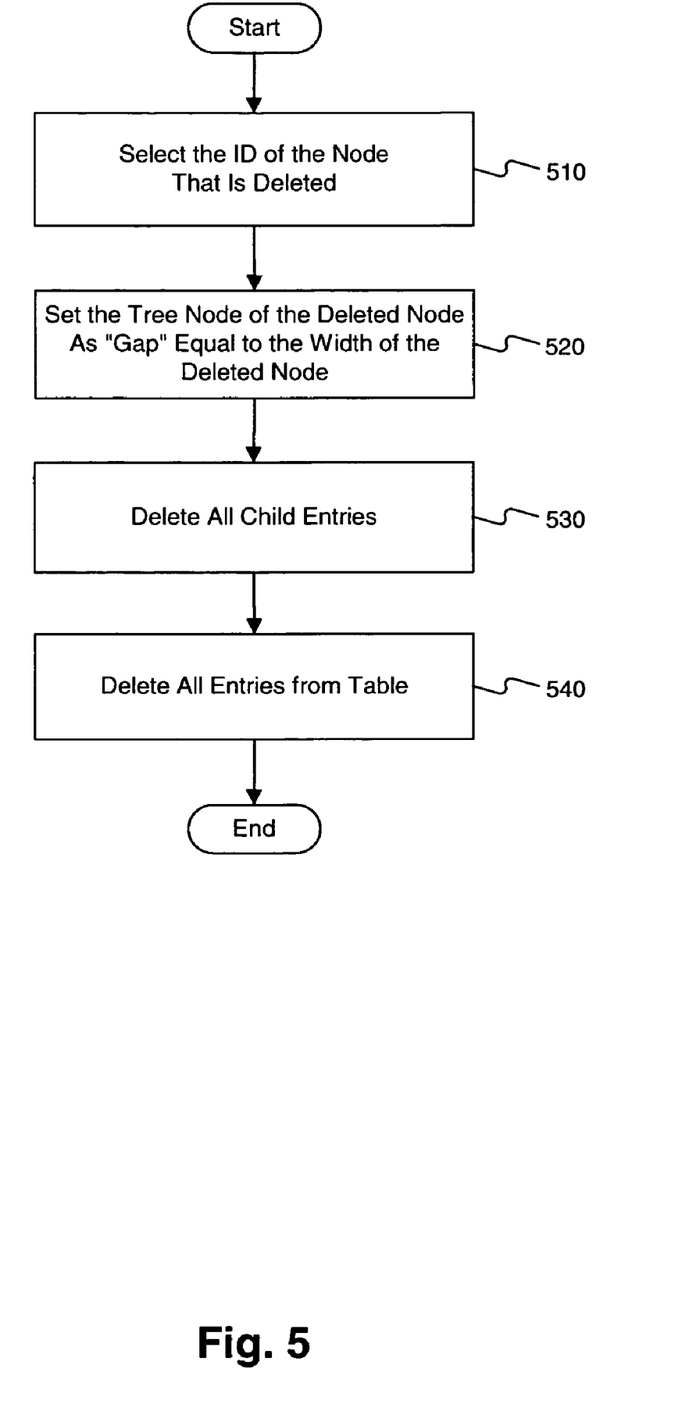
FIG. 5 is an exemplary method for deleting a node in a hierarchical tree structure, consistent with the present invention.

FIG. 5 is an exemplary method for deleting a node in a hierarchical tree structure, consistent with an embodiment of the present invention. To delete a node from the tree structure, system 100 may first select the ID of the node to be deleted (stage 510) and then set the field corresponding to the deleted node in the database table as a "gap" with the width of the deleted node (stage 520). System 100 may then also delete all child entries of the deleted node (stage 530) and delete all the entries corresponding to any child entries from the database table (stage 540). The database entry corresponding to the deleted node is used as a gap in the database entry, and is therefore not deleted from the database. Deleting a node is discussed further with regard to FIGS. 6A-6D.

Figure 6A:
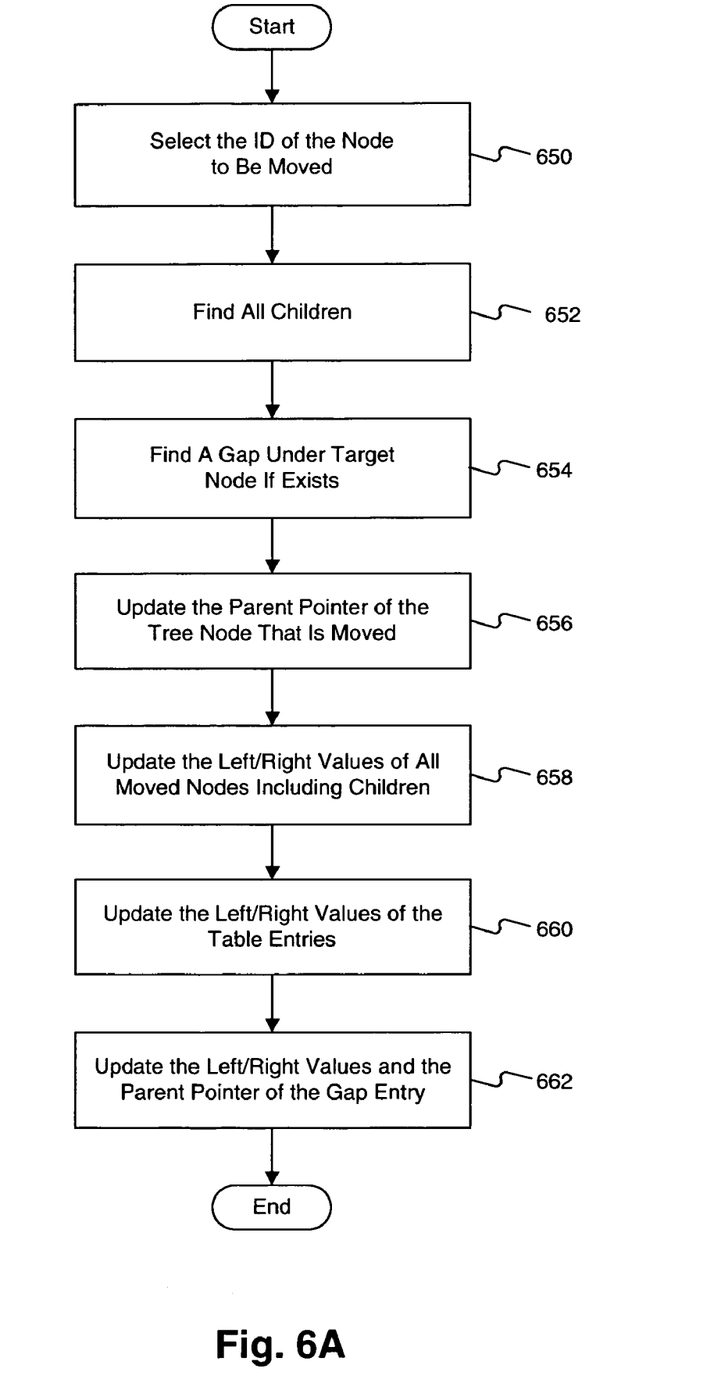
FIG. 6A is an exemplary method for moving a node from one node to another node in a hierarchical tree structure, consistent with the present invention.

FIG. 6A is an exemplary method for moving a node from one node to another node. Therefore, the node is moved from one node (a first location) in the tree structure to another node (a second location). System 100 may first select the ID of the node to be moved to another location in the tree structure (stage 650) and then find all children of the node that is to be moved (stage 652). System 100 may find all the children by searching for child nodes whose left values lie between the tree node interval of the moved node. System 100 may first determine if there is a gap large enough to hold the node that is going to be moved (stage 654). If there is a gap, the new node is inserted into the gap and system 100 may then update the parent pointer of the tree node that was moved to reflect the new parent (stage 656). System 100 may also update the left and right values of all moved nodes including the children (stage 658) and may further update the left right values of the table entries (stage 660) and the left and right values and the parent pointer of the gap entry (stage 662).

Figure 6B:
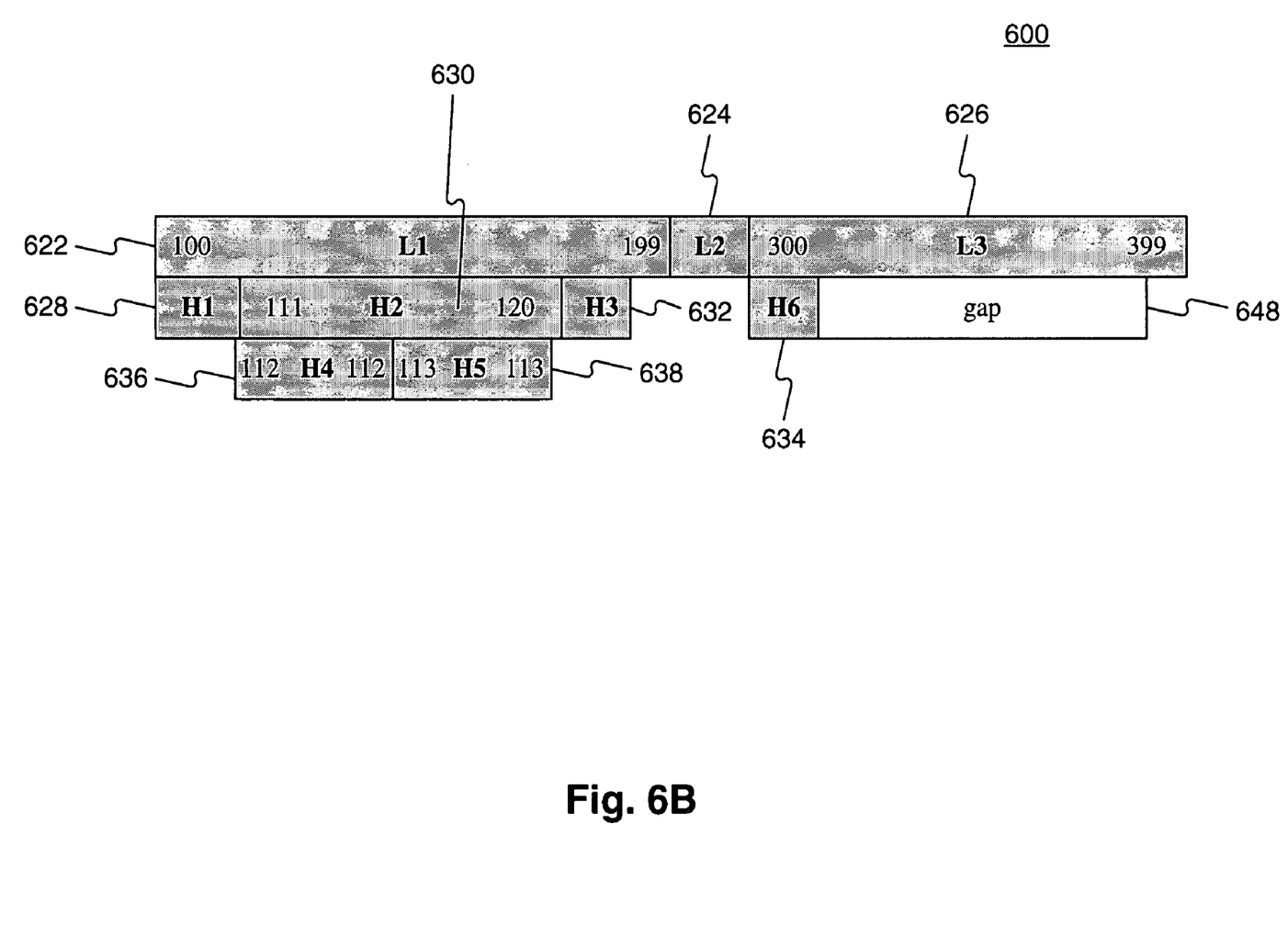
FIG. 6B is an exemplary block diagram of a node being moved from one node to another node in a hierarchical tree structure, consistent with the present invention.
Figure 6C:
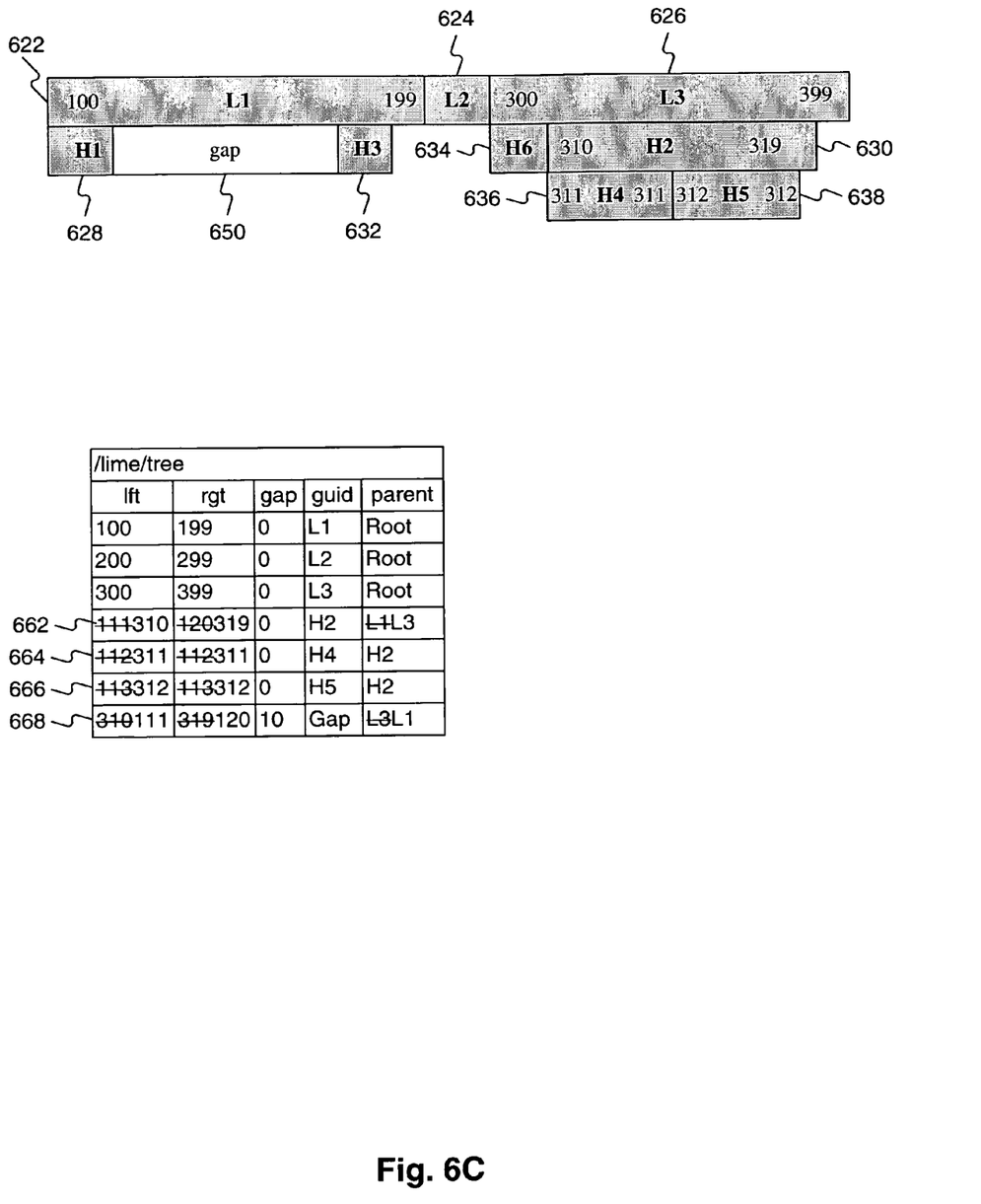
FIG. 6C is yet another exemplary block diagram of a node being moved from one node to another node in a hierarchical tree structure, consistent with the present invention.

FIG. 6B is an exemplary block diagram of a node being moved from one location to another location in a hierarchical tree structure, consistent with an embodiment of the present invention. FIG. 6B will be described along with the method described in FIG. 6A. System 100 may first determine to move node "H2" 630 (stage 650). System 100 may then identify all the children of "H2" 630 as being "H4" 636 and "H5" 638 (stage 652). System 100 may then determine whether a gap exists to move "H2" 630 and determine a gap does exist next to "H6" 634 (stage 654). The node "H2" 630 is moved into the gap as shown in FIG. 6C along with the children "H4" 636 and "H5" 638 (stage 656). The left and right values of all the nodes are also updated in the database tables as shown in table 660. Row 662 reflects "H2" 630 after it was moved therefore the left and right values were changed and updated to "310" and 319". The pointer to "H2"630 was also changed from "L1" and updated to "L3." Row 664 reflects "H4" 514 after the move and therefore the left and right values were changed and updated to "311" and "311". The parent of "H4" 514 did not change, therefore this was not updated in the table. "H5" was also updated in the table as shown in row 666. A "gap" 650 was formed when "H2" 626 was moved, therefore the table 660 reflects this in row 668. The width of the gap is the width of "H2" which is "319–310+1=10" as shown in row 668. The "gap" 650 was updated and now has a left value of "111" and a right value of "120" as shown in row 668. The pointer to the parent of "gap" 650 was also updated to "L1" instead of "L3" as shown in the table in FIG. 6C.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums such as secondary storage devices, like hard disks, floppy disks, or a CD-ROM, RAM or ROM. One skilled in the art will appreciate that these aspects can also be read from other types of computer-readable media, such as a carrier wave from the Internet. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for inserting a new node into a tree structure, the method comprising steps performed by a computer of:

storing the tree structure in at least one database table within a database system, wherein the database system is associated with a memory, wherein the tree structure comprises at least one parent node having space, and at least one child node; wherein the database table contains an entry for each node in the tree structure, and wherein said each node is associated with a plurality of fields stored in the memory, wherein the fields comprise an identification, a left value, a right value, a width, and a tree node interval; wherein each child node comprises a pointer to the associated parent node of the child node; wherein the tree node interval comprises a range between the left value and the right value of the new node; and wherein the new node is a child node having a child node identification corresponding to the identification of the parent node, determining the identification of the parent node of the new node;

determining the width of the new node;

determining whether a gap exists in the tree structure for a parent node having the determined parent node identification, wherein the determining whether the gap exists comprises:

calculating an amount of existing space under the parent node, wherein the amount of existing space is one of (i) a largest difference between the right value of a first child node and the left value of second child node, wherein the first and second child nodes are adjacent to each other under the parent node; (ii) a difference between the right value of the parent node and the highest right value among child nodes under the parent node; and (iii) a difference between the left value of the parent node and the lowest left value among child nodes under the parent node;

determining that the gap exists if the amount of existing space is at least equal to the width of the new node;

determining whether at least one child node exists in the tree structure for the parent node; and setting the left value of the new child node as the left value of the parent node plus 1 if the tree structure includes no child nodes exist;

if the gap exists:

creating a new entry in the database table at the location of the gap;

inserting the new node into the new entry; and setting, in the memory, the left value and the right value of the new node;

if the gap does not exist in the tree structure:

creating a first new entry and second new entry in the database table;

inserting an overflow node into the first new entry, wherein the overflow node has an overflow node identification related to the identification of the associated parent node;

inserting the new node as a new child node into the second new entry, wherein the new child node has the pointer to the overflow node, and the new node has the left value that is larger than the left value of new overflow node; and updating the table in the database system to reflect the new child node. wherein the table comprises information in the tree structure.

2. The method according to claim 1, wherein the gap exists where the right value of one child node is at least 2 values less than the left value of the next child node under the parent node.

3. A system for inserting a new node into a tree structure, the system comprising:

at least one database table within a database system for storing the tree structure, wherein the database system is associated with a memory, wherein the tree structure comprises one or more parent nodes having space, and at least one child node; wherein the database table contains an entry for each node in the tree structure, and wherein said each node is associated with a plurality of fields stored in the memory, wherein the fields comprise an identification, a left value, a right value, a width, and a tree node interval; wherein each child node comprises a pointer to the associated parent node of the child node; wherein the tree node interval comprises of a range between the left value and the right value of the new node; and wherein the new node is a child node having a child node identification corresponding to the identification of the parent node;

a processor; and a memory, wherein the processor and the memory configured to perform steps comprising:

determining the identification of the parent node of the new node;

determining the width of the new node;

determining whether a gap exists in the tree structure for a parent node having the determined parent node identification, wherein the determining whether the gap exists comprises:

calculating an amount of existing space under the parent node, wherein the amount of existing space is one of (i) a largest difference between the right value of a first child node and the left value of second child node, wherein the first and second child nodes are adjacent to each other under the parent node; (ii) a difference between the right value of the parent node and the highest right value among child nodes under the parent node; and (iii) a difference between the left value of the parent node and the lowest left value among child nodes under the parent node;

determining that the gap exists if the amount of existing space is at least equal to the width of the new node;

determining whether at least one child node exists in the tree structure for the parent node; and setting the left value of the new child node as the left value of the parent node plus 1 if the tree structure includes no child nodes exist;

if the gap exists:

creating a new entry in the database table at the location of the gap;

inserting the new node into the new entry; and setting, in the memory, the left value and the right value of the new node;

if the gap does not exist in the tree structure:

creating a first new entry and second new entry in the database table;

inserting an overflow node into the first new entry, wherein the overflow node has an overflow node identification related to the identification of the associated parent node;

inserting the new node as a new child node into the second new entry, wherein the new child node has the pointer to the overflow node, and the new node has the left value that is larger than the left value of new overflow node; and updating the table in the database system to reflect the new child node, wherein the table comprises information in the tree structure.

4. The system of claim 3, wherein the gap exists where the right value of one child node is at least 2 values less than the left value of the next child node under the parent node.

5. A computer-readable storage medium for storing a set of instructions which when executed by a processor performs steps of:

inserting a new node into a tree structure stored in at least one database table within a database system, wherein the database system is associated with a memory, wherein the tree structure comprises at least one parent node having space, and at least one child node; wherein the database table contains an entry for each node in the tree structure, and wherein said each node is associated with a plurality of field stored in the memory, wherein the fields comprise an identification, a left value, a right value, a width, and a tree node interval; wherein each child node comprises of a pointer to the associated parent node of the child node; wherein the tree node interval comprises of a range between the left value and the right value of the new node; and wherein the new node is a child node having a child node identification corresponding to the identification of a parent node;

determining the identification of the parent node of the new node;

determining the width of the new node;

determining whether a gap exists in the tree structure for a parent node having the determined parent node identification, wherein the determining whether the gap exists comprises:

calculating an amount of existing space under the parent node, wherein the amount of existing space is one of (i) a largest difference between the right value of a first child node and the left value of second child node, wherein the first and second child nodes are adjacent to each other under the parent node; (ii) a difference between the right value of the parent node and the highest right value among child nodes under the parent node; and (iii) a difference between the left value of the parent node and the lowest left value among child nodes under the parent node;

determining that the gap exists if the amount of existing space is at least equal to the width of the new node;

determining whether at least one child node exists in the tree structure for the parent node; and setting the left value of the new child node as the left value of the parent node plus 1 if the tree structure includes no child nodes exist;

if the gap exists:
   creating a new entry in the database table at the location of the gap;
   inserting the new node into the new entry; and
   setting, in the memory, the left value and the right value of the new node;

if the gap does not exist in the tree structure:
   creating a first new entry and second new entry in the database table;
   inserting an overflow node into the first new entry, wherein the overflow node has an overflow node identification related to the identification of the associated parent node;
   inserting the new node as a new child node into the second new entry, wherein the new child node has the pointer to the overflow node, and the new node has the left value that is larger than the left value of the new overflow node; and updating the table in the database system to reflect the new child node, wherein the table comprises information in the tree structure.

* * * * *